United States Patent [19]
Kitahata et al.

[11] Patent Number: 6,037,400
[45] Date of Patent: Mar. 14, 2000

[54] COMPOSITION FOR PREVENTION OF ELECTRIC WAVE IN WIDE RANGE AND ELECTRIC WAVE ABSORBER COPING WITH ALL DIRECTIONS USING SAME

[75] Inventors: Shinichi Kitahata, Toride; Keiko Kurata, Tsukuba; Yoshio Nikawa, 884-1, Kamikuratacho, Totsuka-ku, Yokohama-shi; Masaru Chino, 2-3, Hayashi-1-chome, Yokosuka, all of Japan

[73] Assignees: Hitachi Maxell, Ltd, Osaka; Yoshio Nikawa, Yokoyama; Masaru Chino, Yokosuka, all of Japan

[21] Appl. No.: 09/139,261

[22] Filed: Aug. 25, 1998

[30] Foreign Application Priority Data

Aug. 25, 1997 [JP] Japan ..................................... 9-243349

[51] Int. Cl.⁷ ....................................................... C08K 3/00
[52] U.S. Cl. ........................................... 524/495; 524/496
[58] Field of Search ...................... 524/495, 496

[56] References Cited

U.S. PATENT DOCUMENTS

| | | | |
|---|---|---|---|
| 4,579,702 | 4/1986 | O'Brien | 524/496 |
| 5,084,211 | 1/1992 | Kawaguchi et al. | 252/511 |
| 5,300,553 | 4/1994 | Yamanashi et al. | 524/496 |
| 5,696,198 | 12/1997 | Chereisky et al. | 524/496 |

*Primary Examiner*—Edward J. Cain
*Attorney, Agent, or Firm*—Birch, Stewart, Kolasch & Birch, LLP

[57] ABSTRACT

The present invention relates to a lightweight and flexible material for prevention of electric waves having both absorbing properties and shielding properties against electric waves. In the present invention, carbon fiber or magnetic particles, or both and graphitized carbon black are dispersed and incorporated into an insulating substrate so that the weight ratio of the graphitized carbon black to the carbon fiber, the magnetic particles or the sum of the two may be 0.3 to 5.

17 Claims, 1 Drawing Sheet

FIG. 1

COMPOSITION FOR PREVENTION OF ELECTRIC WAVE IN WIDE RANGE AND ELECTRIC WAVE ABSORBER COPING WITH ALL DIRECTIONS USING SAME

BACKGROUND OF THE INVENTION

The present invention relates to a composition for prevention of electric waves in a wide range which is lightweight, flexible, tough and hardly flammable, is suitable as a material for prevention of electric waves, and is used for coping with radiation noises in electronic machines. More particularly, the present invention relates to a composition for prevention of electric waves which is useful as an electric wave absorber coping with all directions or as an EMI shield.

Electronic machines are used widely for various purposes and frequencies used therein range from several koheltzs (frequencies near those of direct current) to the GHz range (the frequency range of electric waves called microwaves). In addition, machines designed to radiate electric waves to the air, such as wireless machines, for example, portable telephones, wireless LAN systems, etc. have been markedly on the increase in recent years.

On the other hand, since electromagnetic waves radiated by these machines cause wrong operations of other electronic machines, there is a strong demand for the reduction of unnecessary radiation from them and the improvement of their resistance to extraneous electromagnetic waves. Moreover, there is pointed out the possibility that the radiated electromagnetic waves have undesirable influences on a human body. Thus, there is also a strong social demand for the reduction of unnecessary electromagnetic waves.

Typical examples of part used for such purposes are filters, shields, and electric wave absorbers. The filters protect machines by passing therethrough necessary signal components but repelling noise components without passage. The shields are such that the inside and outside of a machine to be protected is isolated from each other by surrounding the machine with an electroconductive film. The electric wave absorbers are characterized by converting incident electromagnetic waves to heat to prevent the generation of reflected waves.

Parts such as the filters, however, reflect noise components to return the same, so that the returned noise components are likely to have undesirable influences on other circuits and machines. Furthermore, at a frequency of the order of GHz, signal components are not only passed through a circuit but also radiated to the air in a high proportion, so that it becomes difficult to take an effective measure by using parts such as the filters.

As to the shield, it is almost impossible in practice to cover the machine completely, because of the presence of a signal-introducing portion, heat-radiating holes, etc. In addition, at a high frequency, radiated waves leak out through even a small gap. If the design of the shield is not suitable, the shield acts as an antenna, so that the amount of radiated waves is increased in some cases.

On the other hand, the electric wave absorbers can be ideal for coping with radiation noises because they convert incident electromagnetic waves to heat to prevent the generation of reflected waves. However, a frequency range in which each electric wave absorber is usable is limited depending on a material for the absorber. Therefore, the electric wave absorbers are not suitable for unnecessary radiation having spectrum components in a wide range. Electric wave absorbers usable in a wide frequency range have been developed as those for electric wave darkroom but cannot be used at all in electronic machines because of their large thickness of several tens centimeters or more.

Several examples of electric wave absorbers usable in various frequency ranges, respectively, have been disclosed. For example, Japanese Patent Kokai No. 58-73198 discloses an electric wave shutting-out box obtained by infiltrating or casting an electroconductive composite material matrix prepared by mixing a macromolecular material (e.g. plastic or rubber) with electroconductive carbon fiber, carbon black, graphite or metal powder and kneading them to effect dispersion, into a mat, cloth, net or flaky material of an electroconductive carbon-based fibrous material, a metallic fibrous material or a metallized non-metallic fibrous material. However, this invention increases the decrement of electric field strength in the range of 1 MHz to 100 MHz but is not effective against electric waves having a frequency of more than 100 MHz. Moreover, since the above-mentioned electric wave shutting-out box contains a metallic material and hence has a heavy total weight, its availability is limited.

Japanese Patent Kokai No. 60-249392 discloses an electromagnetic shielding material comprising a composition obtained by dispersing ferrite fine powder composed mainly of manganese and zinc, and electroconductive carbon fine powder in an organic macromolecular material. The composition has a ferrite fine powder content of 30 to 70 vol % and a volume resistivity of $10^2$ to $10\,\mu\cdot$cm, and has electric wave absorbing properties. The composition, however can absorb only electric waves having a frequency in the range of 500 MHz to 1,000 MHz. Moreover, the composition is also limited in availability because it contains manganese, zinc, etc. and hence has a high specific gravity and a low flexibility.

In addition, Japanese Patent Kokai No. 5-21984 discloses a shielding composite material against electromagnetic waves obtained by dispersing in indefinite directions a plurality of coil-shaped carbon fiber pieces in cloth having a low electric conductivity (e.g. cement, synthetic resin, rubber or paper) to support them on the cloth. However, since the coil-shaped carbon fiber pieces tend to be intertwined with one another and hence are difficult to disperse uniformly in the cloth, the composite material is disadvantageous, for example, in that its shielding effect on electromagnetic waves is liable to be nonuniform. Therefore, the composite material is difficult to produce uniformly in a definite thickness or less.

The present applicant has previously applied for a patent on an invention relating to an electric wave absorber comprising graphitized carbon black composite particles composed of crystalline graphite and amorphous carbon black (see Japanese Patent Kokai No. 8-274493). However, this electric wave absorber is effective in absorbing electric waves having a frequency in the range of 50 MHz to 1,000 MHz but is not sufficient in ability to absorb electric waves having a frequency of less than 50 MHz or more than 1,000 MHz. In addition, the thickness of the absorber has to be set at a specific value for making the absorber usable at a specific frequency and hence may not be freely chosen. Furthermore, this absorber absorbs only electric waves coming from a definite direction and cannot absorb electric waves coming from all directions.

In a sheet-like electric wave absorber called a matching type electric wave absorber which has been on the market, or a conventional disclosed electric wave absorber, a conductor plate is set on the side reverse to the electromagnetic wave incidence side, and the energy of electromagnetic waves is converted to heat by utilizing also the effect of the interference of incident electromagnetic wave components and components reflected by the conductor plate, with each other. Therefore, the thickness of such an electric wave absorber is usually adjusted to one-fourth as large as the wavelength of electromagnetic wave. Such electric wave absorbers markedly absorb electromagnetic waves having a specific wavelength but hardly absorb electromagnetic waves having a different wavelength. Moreover, they absorb only electromagnetic waves coming from one direction and hence are not effective against noise components which have a wide spectrum and are various in the direction of their incidence. When used without a conductor plate, the matching type electric wave absorbers transmit electromagnetic waves with almost no absorption.

Thus, there have been reported absorbers having excellent absorption characteristics in a specific frequence range, but there has not yet been reported an absorber which has excellent absorption characteristics in a wide range and in all directions, and is flexible, thin and lightweight.

SUMMARY OF THE INVENTION

The present invention is intended to provide a material for prevention of electric waves having, for example, the following various properties: 1 easily usable, 2 capable of preventing electric waves effectively, 3 excellent in absorption characteristics in a wide range in all directions, 4 flexible, 5 thin, 6 lightweight, 7 tough, and 8 flame-retardant.

In the present invention, there is provided a material for prevention of electric waves having excellent absorption characteristics in a wide range of 30 MHz to 20 GHz, by dispersing and incorporating carbon fiber or magnetic particles, or both and graphitized carbon black into an insulating substrate so that the weight ratio of said graphitized carbon black to said carbon fiber, said magnetic particles or the sum of the two may be 0.3 to 5. Composite particles of the graphitized carbon black are composed of crystalline graphite and amorphous carbon black. The graphitized carbon black composite particles can be obtained by heat-treating carbon black at a high temperature to crystallize the same into graphite gradually from particle surfaces.

In the present invention, there is provided a composition for prevention of electric waves in a wide range having excellent absorption characteristics in a high-frequency range of more than 1,000 MHz, by dispersing and incorporating carbon fiber and graphitized carbon black into an insulating substrate, and adjusting the ratio of the fiber length of said carbon fiber to the particle diameter of said graphitized carbon black to less than 5,000.

In the present invention, there is provided a composition for prevention of electric waves in a wide range having excellent absorption characteristics in a low-frequency range of less than 500 MHz, by dispersing and incorporating carbon fiber and graphitized carbon black into an insulating substrate, and adjusting the ratio of the fiber length of said carbon fiber to the particle diameter of said graphitized carbon black to 5,000 or more.

In the present invention, there is provided a composition for prevention of electric waves in a wide range having excellent absorption characteristics in the wide range, by dispersing and incorporating carbon fiber or magnetic particles, or both and graphitized carbon black into an insulating substrate, and adjusting the ratio of the volume resistivity of the composition measured at 3 MHz ($\rho_{3MHz}$) to the volume resistivity of the composition measured at 100 KHz ($\rho_{100KHz}$) ($\rho_{3MHz}/\rho_{100KHz}$) to 0.1 to 1.5.

In the present invention, a lightweight electric wave absorber coping with all directions is provided by adjusting its specific gravity to 2.5 or less.

In the present invention, a convenient electric wave absorber coping with all directions is provided by imparting thereto a flexibility of 40 (JISA) or less as measured by the rigidity test according to JIS K6253.

In the present invention, there is provided a highly flame-resistant electric wave absorber coping with all directions which has such a flame retardancy that when the fire of a burner is brought close to a test piece (thickness 3.05 mm, width 10.0 mm, length 200 mm) and then removed in the combustion test according to UL94HB, the combustion rate is 38.1 mm/min. or less.

In the present invention, there is provided an electric wave absorber coping with all directions which has a tensile strength of 4.5×106 (Pa) or more as measured by the tensile test according to JIS K6251 (balance method).

DETAILED DESCRIPTION OF THE INVENTION

The present inventors earnestly investigated and consequently found that the present inventive material for prevention of electric waves having excellent absorption characteristics in a wide range of 30 MHz to 20 GHz can be obtained by blending the graphitized carbon black so that the weight ratio of the graphitized carbon black to the aforesaid carbon fiber, the aforesaid magnetic particles or the sum of the two may be 0.3 to 5. When the graphitized carbon black is blended so that the weight ratio of the graphitized carbon black to the aforesaid carbon fiber, the aforesaid magnetic particles or the sum of the two may be 0.3 to 5, the graphitized carbon black absorbs electric waves and the magnetic particles and/or the carbon fiber exhibit shielding properties, so that there is obtained a material for prevention of electric waves which is well balanced in a wide range.

In the present inventive composition for prevention of electric waves in a wide range, the content of the aforesaid graphitized carbon black is such that the weight ratio of the graphitized carbon black to the carbon fiber, the magnetic particles or the sum of the two is 0.3 to 5, preferably 1 to 3.

The present inventive composition for prevention of electric waves in a wide range has excellent absorption characteristics in a high-frequency range of more than 1,000 MHz when the ratio of the fiber length of the aforesaid carbon fiber to the particle diameter of the graphitized carbon black is less than 5,000, preferably 1,300 to 4,000.

The present inventive composition for prevention of electric waves in a wide range has excellent absorption characteristics in a low-frequency range of less than 500 MHz when the ratio of the fiber length of the aforesaid carbon fiber to the particle diameter of the graphitized carbon black is 5,000 or more, preferably 10,000 to 100,000.

The specific gravity of the present inventive electric wave absorber coping with all directions is 2.5 or less, preferably 1.5 or less.

The flexibility of the present inventive electric wave absorber coping with all directions is 50 (JISA) or less, preferably 40 (JISA) or less, as measured by the rigidity test according to JIS K6253.

The tensile strength of the present inventive electric wave absorber coping with all directions is 4×10⁶ (Pa) or more, preferably 6×10⁶ (Pa) or more, as measured by the tensile test according to JIS K6251 (balance method).

The present inventive composition for prevention of electric waves in a wide range is a lightweight and flexible material which absorbs 10% or more (at a thickness of the composition of 2 mm) of electromagnetic waves in terms of electric power at at least one frequency in a wide frequency range of 30 KHz to 20 GHz, and moreover has such shielding properties that the degree of transmission is 10% or less. That is, the term "a wide range" used in the passage "composition for prevention of electric waves in a wide range" in the present specification means a frequency range of 30 MHz to 20 GHz.

As to the role of the graphitized carbon black composite particles in the material for prevention of electric waves of the present invention, the composite particles have an effect of absorbing electromagnetic waves mainly. It is generally known that a material containing only electroconductive fiber has a high electroconductivity and can be used as an excellent shielding material. But, such a shielding material shuts out incident electromagnetic waves by reflecting them, and has little effect of absorbing electromagnetic waves. A material containing the graphitized carbon black composite particles alone absorbs electromagnetic waves to a certain extent, but it transmits many components, namely, it is poor in shielding properties. A material for prevention of electric waves having not only excellent shielding properties against electromagnetic waves but also an ability to absorb electromagnetic waves can be obtained by incorporating thereinto both the graphitized carbon black composite particles and electroconductive fiber present.

The material for prevention of electric waves of the present invention is characterized in that it can be used as it is as an electric wave absorber without using a conductor plate and absorbs electric waves in a wide frequency range to a certain extent while imparting shielding properties. Thus, the concept of this material is different from those of conventional electric wave absorbers. Although said material is expressed in the words "electric wave absorber" because of its characteristic, the ability to absorb electromagnetic waves, it can be expressed also in the words "noise absorber" because it is suitable for coping with noises in electronic machines. In coping with noises in electronic machines, since it is very difficult to estimate the amount of noises produced and their frequency distribution previously, various parts for coping with noises are unavoidably set after completion of the construction of the machines as occasion demands. There is desired a part which can keep noise components in the range prescribed in the noise regulation, by a simple means even if the part cannot absorb them completely. From this point of view, the material for prevention of electric waves of the present invention is considered very effective.

As the insulating substrate used for forming the material for prevention of electric waves of the present invention, there are mainly used organic macromolecular materials having characteristics such as strength, heat resistance, moldability, flame retardancy, flexibility, etc., which are suitable for uses of the material for prevention of electric waves. Such organic macromolecular materials include, for example, various elastomers (e.g. chloroprene rubber, acrylonitrile-butadiene rubber, styrene-butadiene rubber, natural rubber, polyisoprene rubber), polyolefin resins, vinylidene chloride resins, polyamide resins, polyether ketone resins, vinyl chloride resins, polyester resins, alkyd resins, phenolic resins, epoxy resins, acrylic resins, urethane resins, silicone resins, cellulosic resins, vinyl acetate resins, polycarbonate resins, etc. These may be used singly or as a mixture thereof. Of these, the silicone resins are preferable. If necessary, solvents, dispersants, stabilizers, lubricants, fillers, bulking agents, plasticizers, crosslinking agents, antioxidants, vulcanization accelerators, etc. may be incorporated into the insulating substrate.

The term "insulating substrate" used in the present specification means a substance which is preferably used as an insulating material having a dielectric loss tangent tan δ (expressing the ratio of imaginary number portion to real number portion of complex dielectric constant) of 0.1 or less at the frequency of objective electromagnetic waves. Such a substance is represented by the above-exemplified organic macromolecular materials, though organic substances other than those exemplified above, inorganic substances, or complexes thereof may be used without any problem.

As a value characterizing the graphitized carbon black composite particles, there is used the abundance of crystalline graphite (the degree of graphitization) calculated from a peak area corresponding to (002) plane in an X-ray diffraction pattern. The degree of graphitization is preferably 5 to 90%, more preferably 10 to 70%.

The particle diameter of the graphitized carbon black is preferably 1 nm to 10 μm, more preferably 10 nm to 100 nm.

As the magnetic particles in the material for prevention of electric waves of the present invention, there are preferably used magnetic particles classified among soft ferrites having a weak coercive force. The magnetic particles are similar to the graphitized carbon black in that they have an effect of absorbing electric waves. But, the former exhibits the effect in a frequency range different from that in the case of the latter. In detail, the magnetic particles are characterized by being effective in a low-frequency range of tens to hundreds megahertzs, while the graphitized carbon black is effective at a high frequency of 1 GHz or more. Typical examples of the magnetic particles are soft magnetic particles such as Mn—Zn ferrite, etc. Magnetite and γ-iron oxide may also be used. Hexagonal planar type ferrites may also be used. The particle size of the magnetic particles is preferably 0.1 μm to 5 μm.

When the weight ratio of the graphitized carbon black to the carbon fiber, the magnetic particles or the sum of the two in the present invention is less than 0.3 because of the presence of the excess magnetic particles, the material for prevention of electric waves is increased in weight and hence is difficult to make lightweight. Moreover, its bending becomes difficult and its flexibility tends to be deteriorated.

The material for prevention of electric waves of the present invention can be produced by a conventional process such as kneading. In general, for kneading the graphitized carbon black and the carbon fiber and/or the magnetic particles with an insulating substrate such as rubber or synthetic resin to disperse them therein uniformly, a kneader, ball mill, roll mill, jet mil or the like is used.

An example of dispersing machine used for producing the material for prevention of electric waves of the present invention is an apparatus of a type called a kneader, which is characterized by applying strong compressive force, shearing force, etc. Although the filler components may be dispersed after being charged together into the dispersing machine, it is preferable to prepare masterbatches by dispersing the filler components, respectively, and blending the masterbatches to prepare a material for prevention of electric waves having a predetermined composition, because the most suitable dispersion conditions vary depending on the kinds of the fillers.

As an example, a method for dispersing graphitized carbon black particles is described below. The graphitized carbon black is previously charged into a dispersing machine and disintegrated for several minutes. Then, a resin component for an insulating substrate is added in an amount of minimum parts by weight required for making the graphitized carbon black into a uniform paste, after which pre-kneading is carried out. Very strong compressive force, shearing force, etc. can be applied by this method. Such kneading is carried out for 30 minutes to 2 hours. When the resin component is added in excess in the pre-kneading, the viscosity of the paste is lowered, so that necessary compressive force, shearing force, etc. cannot be applied to the paste. When the amount of the resin component is too small, uniform compressive force, shearing force, etc. cannot be applied to the whole paste, so that no homogeneous paste can be obtained. Additional resin component is then added to the paste subjected to the pre-kneading, by an arbitrary means such as a kneader or a mixer to prepare a paste having a predetermined composition. For the additional mixing of the resin component, a generally used mixer or the like can be used because strong compressive force, etc. are not necessary. Thus, a masterbatch is prepared.

Master batches containing the electroconductive fiber and the magnetic particles, respectively, can be prepared in the same manner as in the case of the graphitized carbon black.

Next, the obtained masterbatches are mixed to obtain a mixture having a predetermined composition, and a curing agent and the like are added if necessary, after which the thus obtained mixture is formed into a sheet with a pressure roll, an injection molding machine, a press molding machine or the like. As an another method, it is also possible to form the mixture by extrusion onto the insulating coating surface of a conductor cable.

When an electric wave absorber is obtained by using the composition of the present invention, the material for prevention of electric waves is not particularly limited in form and can be processed into various forms such as various molded articles, sheets, coating materials, caulking products, sealants, etc. as occasion demands. In any of the various forms, said material can exhibits its characteristics in all directions. In particular, the electric wave absorber is often obtained in the form of a thin plate or a container because of its uses. In this case, said material is especially suitable for injection molding, a means for mass production in the present invention. The reason is that the material is lightweight and flexible and hence can be uniformly packed into a mold even under a low pressure and that the material is excellent also in mold release characteristics when a silicone resin or the like is used as the main component of the insulating substrate. Furthermore, the material is advantageous in that when molded into a container of thin make, the material can exhibit characteristics in all directions as a whole because nonisotropic particles such as carbon fiber are oriented substantially in parallel on the container surface.

In addition, two or more of the electric wave absorbers can be laminated, or the electric wave absorber can be laminated on another electric wave absorber, an EMI shield and/or a metal plate resistor.

DESCRIPTION OF THE PREFERRED EMBODIMENTS

The material for prevention of electric waves of the present invention is explained in further detail with the following actual examples.

ACTUAL EXAMPLE 1

The production of a material for prevention of electric waves is explained below by dividing it into two steps, a step of preparing masterbatches and a subsequent step of composition adjustment and molding.

First step: Preparation of Masterbatches (1) Preparation of a Graphitized Carbon Black Masterbatch Into a kneader (Model PNV-5H for 5l, a desktop kneader mfd. by IRIE SHOKAI CO., LTD.) was charged 220 g of graphitized carbon black particles [degree of graphitization: 31% (the abundance of crystalline graphite calculated from a peak area corresponding to (002) plane in an X-ray diffraction pattern obtained by measuring X-ray diffraction with Cu as a target at a acceleration voltage of 50 kV, a current of 100 mA and an angle $2\theta$ varying from 10° to 100° by means of an X-ray diffraction apparatus RINT1500 mfd. by RIGAKU DENKI CO., LTD.), particle diameter: 30 nm], and disintegrated by operating the kneader for 10 minutes. Then, 1.351 g of a silicone resin [TES 3032, mfd. by Toshiba Silicone Co., Ltd., (complex dielectric constant: real number portion 2.9, imaginary number portion 0.0026), a main agent] was added thereto, and the resulting mixture was kneaded for 2 hours while cooling the kneader with water. Subsequently, a silicone resin (TES 3032, mfd. by Toshiba Silicone Co., Ltd.; main agent) was added dropwise over a period of 1 hour to prepare a carbon black masterbatch. The carbon black content was 14.0 wt %.

(2) Preparation of an Electroconductive Fiber Masterbatch

Into a kneader (Model PNV-5H for 5l, a desktop kneader mfd. by IRIE SHOKAI CO., LTD.) was charged carbon fiber (BESFITE HTA-CMF type, mfd. by Toho Rayon Co., Ltd.; length 40 microns), and disintegrated by operating the kneader for 10 minutes. Then, 2,000 g of a silicone resin (TES 3032, mfd. by Toshiba Silicone Co., Ltd., a main agent) was added thereto and the resulting mixture was kneaded for 2 hours while cooling the kneader with water, to prepare a carbon fiber masterbatch. The carbon fiber content was 50 wt %. Master batches having a carbon fiber content of 50 wt % were obtained by carrying out kneading in the same manner as above except for changing the length of the carbon fiber to 1 mm or 3 mm.

(3) Preparation of Magnetic Particles (ferrite) Masterbatch

Into a kneader (Model PNV-5H for 5l, a desktop kneader mfd. by IRIE SHOKAI CO., LTD.) was charged 2,000 g of soft ferrite particles (MAT-305, mfd. by TODA KOGYO CO., LTD.; coercive force 5 oersteds), and disintegrated by operating the kneader for 10 minutes. Then, 2,000 g of a silicone resin (TES 3032, mfd. by Toshiba Silicone Co., Ltd., a main agent) was added thereto and the result-ing mixture was kneaded for 2 hours while cooling the kneader with water, to prepare a ferrite masterbatch. The ferrite content was 50 wt %.

Second step: Composition Adjustment and Molding 8.57 Grams of the graphitized carbon black composite particles masterbatch and 0.60 g of the 3-mm carbon fiber masterbatch were measured off, followed by adding thereto 18.24 g of a silicone resin (a main agent), and they were placed in a container for a defoaming mixer and mixed in the defoaming mixer for 8 minutes. Then, 2.59 g of a silicone resin (a curing agent) was added thereto, followed by mixing for another 2 minutes.

The resulting mixture was heated at 120° for 1 minute with an injection molding machine by using a mold for 2 mm thickness. The mixture was taken out of the testing press and kept in an oven at 120° for another 1 hour to be completely cured. Thus, there was produced a sheet-like material for prevention of electric waves having a predetermined thickness of 2 mm and containing 4 wt % of carbon black and 1 wt % of carbon fiber.

ACTUAL EXAMPLES 2 to 16

Using the masterbatches prepared in Actual Example 1, materials for prevention of electric waves of Actual Examples 2 to 16 were produced in the same manner as in Actual Example 1 except for using the starting materials in the amounts shown in Table 1.

TABLE 1

(Composition)

| Actual Example | Graphitized carbon black (wt. %) | Carbon fiber (wt. %) Length | | | | | Magnetic particles (ferrite) (wt. %) |
|---|---|---|---|---|---|---|---|
| | | 40 μm | 120 μm | 0.3 mm | 1 mm | 3 mm | |
| 1 | 4 | 0 | 0 | 0 | 0 | 1 | 0 |
| 2 | 4 | 0 | 0 | 0 | 0 | 3 | 0 |
| 3 | 4 | 0 | 0 | 0 | 0 | 5 | 0 |
| 4 | 3 | 0 | 0 | 0 | 0 | 1 | 0 |
| 5 | 3 | 0 | 0 | 0 | 0 | 3 | 0 |
| 6 | 3 | 6 | 0 | 0 | 0 | 0 | 0 |
| 7 | 4 | 0 | 0 | 0 | 0 | 3 | 3 |
| 8 | 4 | 0 | 0 | 0 | 0 | 5 | 3 |
| 9 | 4 | 0 | 0 | 0 | 1 | 0 | 0 |
| 10 | 4 | 0 | 0 | 1 | 0 | 0 | 0 |
| 11 | 4 | 0 | 1 | 0 | 0 | 0 | 0 |
| 12 | 0 | 20 | 0 | 0 | 0 | 0 | 0 |
| 13 | 4 | 0 | 0 | 0 | 0 | 20 | 0 |
| 14 | 4 | 0 | 0 | 0 | 0 | 0 | 0 |
| 15 | 10 | 0 | 0 | 0 | 0 | 1 | 0 |
| 16 | 0 | 0 | 0 | 0 | 0 | 0 | 0 |

(Blending amount)

| Actual Example | Weight of masterbatch (g) | | Magnetic particles (ferrite) | Silicone resin (main agent) (g) | Silicon resin (Curing agent) (g) |
|---|---|---|---|---|---|
| | Graphitized carbon black | Carbon fiber (length) | | | |
| 1 | 8.57 | 0.60 (3 mm) | 0 | 18.24 | 2.59 |
| 2 | 8.57 | 1.80 (3 mm) | 0 | 17.09 | 2.54 |
| 3 | 8.57 | 3.00 (3 mm) | 0 | 15.95 | 2.48 |

TABLE 1-continued

| 4 | 6.43 | 0.60 (3 mm) | 0 | 20.35 | 2.62 |
|---|---|---|---|---|---|
| 5 | 6.43 | 1.80 (3 mm) | 0 | 19.21 | 2.56 |
| 6 | 6.43 | 3.60 (40 μm) | 0 | 18.06 | 2.51 |
| 7 | 8.57 | 1.80 (3 mm) | 1.8 | 19.21 | 2.56 |
| 8 | 8.57 | 3.00 (3 μm) | 1.8 | 11.59 | 2.13 |
| 9 | 8.57 | 0.60 (1 mm) | 0 | 18.24 | 2.59 |
| 10 | 8.57 | 0.60 (0.3 mm) | 0 | 18.24 | 2.59 |
| 11 | 8.57 | 0.60 (120 μm) | 0 | 18.24 | 2.59 |
| 12 | 0.00 | 12.00 (40 μm) | 0 | 15.82 | 2.18 |
| 13 | 8.57 | 12.00 (3 mm) | 0 | 15.82 | 2.18 |
| 14 | 8.57 | 0.00 | 0 | 18.81 | 2.62 |
| 15 | 21.43 | 0.60 (3 mm) | 0 | 6.12 | 2.45 |
| 16 | 0.00 | 0.00 | 1.8 | 25.6 | 2.65 |

The return loss and degree of transmission at 0.05 GHz to 20 GHz of the samples produced in the above actual examples were measured by means of a HP8720C network analyzer mfd. by HEWLETT-PACKARD. The electric power of incident electric waves was taken as 100% and each measured value was converted to electric power and expressed as a percentage. A remainder obtained by subtracting reflected electric power and transmitted electric power from the incoming electric power was taken as absorbed electric power. In this case, a low degree of transmission indicates excellent shielding properties.

The volume resistivity was measured by means of a commercially available impedance analyzer. In the present invention, 4192A LF IMPEDANCE ANALYZER (using 16047A TEST FIXTURE) mfd. by HEWLETT-PACKARD was used. Each sample was formed into a 1 cm×1 cm piece of 1 mm thick, and an electrode was attached to each side of the piece, after which the electric resistance was measured at 100 KHz and 3 MHz, whereby the volume resistivity values were obtained.

The rigidity was measured by the rigidity test method according to JIS K6253.

The flame retardancy was determined from a combustion rate (mm/min.) measured when the fire of a burner is brought close to a test piece (thickness 3.05 mm, width 10.0 mm, length 200 mm) and then removed in the combustion test according to UL94HB.

The tensile strength was measured according to JIS K6251 (balance method).

The measurement results are shown in Table 2.

TABLE 2

| | | Characteristics | | | | | | | | | |
|---|---|---|---|---|---|---|---|---|---|---|---|
| | Frequency (GHz) | Degree of transmission (%) | Degree of reflection (%) | Degree of absorption (%) | $\rho_{100KHz}$ (Ω·cm) | $\rho_{3MHz}$ (Ω·cm) | $\rho_{100\,KHz}/\rho_{3MHz}$ | Specific gravity (g/cm³) | Rigidity | Tensile strength (×10⁶ Pa) | Combustion rate (mm/min.) |
| 1 | 0.05 | 9.8 | 57.0 | 33.2 | 59.8 | 19.8 | 0.33 | 1.02 | 36 | 5.5 | 32 |
| | 0.25 | 6.9 | 67.7 | 25.4 | | | | | | | |
| | 0.45 | 6.8 | 63.2 | 30.0 | | | | | | | |
| | 0.5 | 6.7 | 59.6 | 33.7 | | | | | | | |
| | 1.2 | 5.5 | 69.0 | 25.5 | | | | | | | |
| | 2 | 4.4 | 76.6 | 19.0 | | | | | | | |
| | 14 | 0.9 | 38.6 | 60.5 | | | | | | | |
| 2 | 0.05 | 3.9 | 67.4 | 28.7 | 24.8 | 11.6 | 0.47 | 1.05 | 38 | 5.1 | 31 |
| | 0.25 | 1.6 | 79.3 | 19.1 | | | | | | | |
| | 0.45 | 1.0 | 81.1 | 17.9 | | | | | | | |
| | 0.5 | 0.9 | 83.6 | 15.3 | | | | | | | |

TABLE 2-continued

| | | | | | Characteristics | | | | | | |
|---|---|---|---|---|---|---|---|---|---|---|---|
| | Frequency (GHz) | Degree of transmission (%) | Degree of reflection (%) | Degree of absorption (%) | $\rho_{100KHz}$ ($\Omega \cdot cm$) | $\rho_{3MHz}$ ($\Omega \cdot cm$) | $\rho_{100\,KHz}/\rho_{3MHz}$ | Specific gravity (g/cm$^3$) | Rigidity | Tensile strength (×10$^6$ Pa) | Combustion rate (mm/min.) |
|   | 1.2  | 0.9  | 85.7 | 13.4 |      |       |      |      |    |     |    |
|   | 2    | 0.9  | 88.5 | 10.6 |      |       |      |      |    |     |    |
|   | 14   | 0.0  | 66.5 | 33.5 |      |       |      |      |    |     |    |
| 3 | 0.05 | 1.1  | 80.8 | 18.1 | 6.6  | 5.6   | 0.78 | 1.06 | 44 | 5.8 | 30 |
|   | 0.25 | 0.6  | 85.5 | 13.9 |      |       |      |      |    |     |    |
|   | 0.45 | 0.6  | 87.3 | 12.1 |      |       |      |      |    |     |    |
|   | 0.5  | 0.5  | 87.7 | 11.8 |      |       |      |      |    |     |    |
|   | 1.2  | 0.5  | 89.1 | 10.4 |      |       |      |      |    |     |    |
|   | 2    | 0.5  | 89.9 | 9.6  |      |       |      |      |    |     |    |
|   | 14   | 0.0  | 70.3 | 29.7 |      |       |      |      |    |     |    |
| 4 | 0.05 | 13.3 | 54.7 | 32.0 | 374  | 107.4 | 0.29 | 1.02 | 36 | 6.2 | 28 |
|   | 0.25 | 8.5  | 62.4 | 29.1 |      |       |      |      |    |     |    |
|   | 0.45 | 5.6  | 65.4 | 29.0 |      |       |      |      |    |     |    |
|   | 0.5  | 5.3  | 66.5 | 28.2 |      |       |      |      |    |     |    |
|   | 1.2  | 3.8  | 72.3 | 23.9 |      |       |      |      |    |     |    |
|   | 2    | 3.2  | 76.2 | 20.6 |      |       |      |      |    |     |    |
|   | 14   | 4.2  | 55.2 | 40.6 |      |       |      |      |    |     |    |
| 5 | 0.05 | 10.5 | 48.9 | 40.6 | 40.8 | 29.8  | 0.73 | 1.04 | 37 | 5.8 | 29 |
|   | 0.25 | 4.5  | 67.5 | 28.0 |      |       |      |      |    |     |    |
|   | 0.45 | 4.4  | 70.9 | 24.7 |      |       |      |      |    |     |    |
|   | 0.5  | 4.4  | 72.1 | 23.5 |      |       |      |      |    |     |    |
|   | 1.2  | 2.6  | 75.2 | 22.2 |      |       |      |      |    |     |    |
|   | 2    | 2.1  | 80.2 | 17.7 |      |       |      |      |    |     |    |
|   | 14   | 0.3  | 57.3 | 42.4 |      |       |      |      |    |     |    |
| 6 | 0.05 | 38.4 | 19.5 | 42.1 | 52   | 25.4  | 0.49 | 1.07 | 39 | 4.8 | 33 |
|   | 0.25 | 17.5 | 45.4 | 37.1 |      |       |      |      |    |     |    |
|   | 0.45 | 12.9 | 55.4 | 31.7 |      |       |      |      |    |     |    |
|   | 0.5  | 10.3 | 58.6 | 31.1 |      |       |      |      |    |     |    |
|   | 1.2  | 6.0  | 68.1 | 25.9 |      |       |      |      |    |     |    |
|   | 2    | 4.6  | 75.9 | 19.5 |      |       |      |      |    |     |    |
|   | 14   | 0.4  | 57.9 | 41.7 |      |       |      |      |    |     |    |
| 7 | 0.05 | 3.8  | 65.1 | 31.1 | 25.6 | 13.8  | 0.54 | 1.07 | 38 | 8   | 30 |
|   | 0.25 | 1.7  | 60.1 | 38.2 |      |       |      |      |    |     |    |
|   | 0.45 | 1.2  | 64.8 | 34.0 |      |       |      |      |    |     |    |
|   | 0.5  | 1.1  | 66.4 | 32.5 |      |       |      |      |    |     |    |
|   | 1.2  | 0.5  | 71.4 | 28.1 |      |       |      |      |    |     |    |
|   | 2    | 0.3  | 87.7 | 12.0 |      |       |      |      |    |     |    |
|   | 14   | 0.0  | 71.5 | 28.5 |      |       |      |      |    |     |    |
| 8 | 0.05 | 1.5  | 70.1 | 28.4 | 10.4 | 8.2   | 0.79 | 1.09 | 37 | 8.1 | 25 |
|   | 0.25 | 0.5  | 66.9 | 32.6 |      |       |      |      |    |     |    |
|   | 0.45 | 0.4  | 68.2 | 31.4 |      |       |      |      |    |     |    |
|   | 0.5  | 0.4  | 71.5 | 28.1 |      |       |      |      |    |     |    |
|   | 1.2  | 0.3  | 77.7 | 22.0 |      |       |      |      |    |     |    |
|   | 2    | 0.2  | 89.4 | 10.4 |      |       |      |      |    |     |    |
|   | 14   | 0.0  | 73.3 | 26.7 |      |       |      |      |    |     |    |
| 9 | 0.05 | 8.5  | 63.0 | 28.5 | 68.2 | 34.8  | 0.51 | 1.02 | 43 | 4.7 | 30 |
|   | 0.25 | 7.9  | 59.3 | 32.8 |      |       |      |      |    |     |    |
|   | 0.45 | 7.7  | 59.0 | 38.3 |      |       |      |      |    |     |    |
|   | 0.5  | 6.8  | 47.9 | 45.3 |      |       |      |      |    |     |    |
|   | 1.2  | 5.2  | 52.3 | 42.5 |      |       |      |      |    |     |    |
|   | 2    | 4.5  | 59.9 | 35.6 |      |       |      |      |    |     |    |
|   | 14   | 1.9  | 65.7 | 32.4 |      |       |      |      |    |     |    |
| 10 | 0.05 | 12.7 | 61.1 | 26.2 | 115 | 56.5 | 0.49 | 1.02 | 41 | 4.4 | 39 |
|    | 0.25 | 11.0 | 60.9 | 28.1 |     |      |      |      |    |     |    |
|    | 0.45 | 10.8 | 56.4 | 32.8 |     |      |      |      |    |     |    |
|    | 0.5  | 8.8  | 49.0 | 42.2 |     |      |      |      |    |     |    |
|    | 1.2  | 7.6  | 54.8 | 37.6 |     |      |      |      |    |     |    |
|    | 2    | 2.9  | 71.0 | 26.1 |     |      |      |      |    |     |    |
|    | 14   | 1.6  | 69.9 | 28.5 |     |      |      |      |    |     |    |
| 11 | 0.05 | 34.4 | 43.0 | 22.6 | 920 | 286  | 0.31 | 1.02 | 41 | 4.5 | 33 |
|    | 0.25 | 28.1 | 48.5 | 23.4 |     |      |      |      |    |     |    |
|    | 0.45 | 24.7 | 48.5 | 26.8 |     |      |      |      |    |     |    |
|    | 0.5  | 19.1 | 47.9 | 31.0 |     |      |      |      |    |     |    |
|    | 1.2  | 6.6  | 63.7 | 29.7 |     |      |      |      |    |     |    |
|    | 2    | 4.8  | 55.1 | 40.1 |     |      |      |      |    |     |    |
|    | 14   | 1.1  | 60.3 | 38.6 |     |      |      |      |    |     |    |
| 12 | 0.05 | 93.3 | 0.3  | 6.4  | 250 | 238  | 0.95 | 1.19 | 44 | 5.9 | 30 |
|    | 0.25 | 82.9 | 2.4  | 14.7 |     |      |      |      |    |     |    |
|    | 0.45 | 76.2 | 5.3  | 18.5 |     |      |      |      |    |     |    |
|    | 0.5  | 73.9 | 5.5  | 20.6 |     |      |      |      |    |     |    |
|    | 1.2  | 63.8 | 11.1 | 25.1 |     |      |      |      |    |     |    |

TABLE 2-continued

| | Frequency (GHz) | Degree of transmission (%) | Degree of reflection (%) | Degree of absorption (%) | $\rho_{100KHz}$ ($\Omega \cdot cm$) | $\rho_{3MHz}$ ($\Omega \cdot cm$) | $\rho_{100 KHz}/\rho_{3MHz}$ | Specific gravity (g/cm$^3$) | Rigidity | Tensile strength ($\times 10^6$ Pa) | Combustion rate (mm/min.) |
|---|---|---|---|---|---|---|---|---|---|---|---|
| | 2 | 56.6 | 16.1 | 27.3 | | | | | | | |
| | 14 | 26.2 | 50.7 | 23.1 | | | | | | | |
| 13 | 0.05 | 18.3 | 76.4 | 5.3 | 5.2 | 4.96 | 0.95 | 1.22 | 49 | 6.3 | 28 |
| | 0.25 | 10.5 | 82.9 | 6.6 | | | | | | | |
| | 0.45 | 4.0 | 90.2 | 5.8 | | | | | | | |
| | 0.5 | 3.5 | 90.8 | 5.7 | | | | | | | |
| | 1.2 | 0.0 | 92.4 | 7.6 | | | | | | | |
| | 2 | 0.0 | 96.6 | 3.4 | | | | | | | |
| | 14 | 0.0 | 97.7 | 2.3 | | | | | | | |
| 14 | 0.05 | 92.7 | 3.2 | 4.1 | 1368 | 268 | 0.20 | 1.02 | 38 | 5.1 | 32 |
| | 0.25 | 91.8 | 1.6 | 6.6 | | | | | | | |
| | 0.45 | 86.4 | 1.8 | 11.8 | | | | | | | |
| | 0.5 | 86.3 | 1.8 | 11.9 | | | | | | | |
| | 1.2 | 79.1 | 3.3 | 17.6 | | | | | | | |
| | 2 | 75.7 | 5.5 | 18.8 | | | | | | | |
| | 14 | 41.1 | 33.4 | 25.5 | | | | | | | |
| 15 | 0.05 | 45.5 | 17.9 | 36.6 | 21.6 | 1.28 | 0.05 | 1.02 | 41 | 6.1 | 15 |
| | 0.25 | 32.0 | 25.9 | 42.1 | | | | | | | |
| | 0.45 | 31.8 | 20.8 | 47.4 | | | | | | | |
| | 0.5 | 31.6 | 20.4 | 48.0 | | | | | | | |
| | 1.2 | 31.2 | 21.4 | 47.4 | | | | | | | |
| | 2 | 30.8 | 24.9 | 44.3 | | | | | | | |
| | 14 | 18.0 | 41.4 | 40.6 | | | | | | | |
| 16 | 0.05 | 10.5 | 48.9 | 40.6 | 78200 | 3060 | 0.039 | 1.02 | 32 | 4.6 | 60 |
| | 0.25 | 4.5 | 67.5 | 28.0 | | | | | | | |
| | 0.45 | 4.4 | 70.9 | 24.7 | | | | | | | |
| | 0.5 | 4.4 | 72.1 | 23.5 | | | | | | | |
| | 1.2 | 2.6 | 75.2 | 22.2 | | | | | | | |
| | 2 | 2.1 | 80.2 | 17.7 | | | | | | | |
| | 14 | 0.3 | 57.3 | 42.4 | | | | | | | |

As is clear from the results shown in Table 2, all of the materials for prevention of electric waves of the present invention has a degree of absorption of 10% or more and a degree of transmittance of 10% or less at any frequency in the measuring frequency range and hence are considered effective in coping with radiation noises.

[Magnetic particles other than ferrites]

Next, there were investigated electric wave absorbing characteristics attained in the case of using a material other than ferrites as magnetic particles.

ACTUAL EXAMPLE 17

According to the recipe shown as Composition 1, the graphitized carbon black composite particles masterbatch was measured off, followed by adding thereto Mn—Zn-ferrite and then a thermosetting silicone resin as main agent, and they were mixed in a KENMIX mixer for 30 minutes. A portion of the resulting mixture was taken in a container in an amount necessary for molding, and a thermosetting silicone resin as curing agent was added, followed by mixing in a defoaming mixer for 2 minutes.

The resulting mixture was heated at 120° for 1 minute with a testing press by using a mold for 2 mm thickness. For curing the mixture completely, the mixture was kept in an oven at 120° for another 1 hour. Thus, there was produced a sheet of 2 mm thick of a composition for preventing hindrance by electromagnetic waves.

| Composition 1 | |
|---|---|
| Graphitized carbon black composite particles | 3 parts by weight |
| Mn—Zn-ferrite | 30 parts by weight |
| Thermosetting silicone resin (a main agent) | 61 parts by weight |
| Thermosetting silicone resin (a curing agent) | 6 parts by weight |

ACTUAL EXAMPLE 18

Starting materials were mixed according to the recipe shown as Composition 2. and a sheet of 2 mm thick of a composition for preventing hindrance by electromagnetic waves was produced by the same method as in the case of Composition 1.

| Composition 2 | |
|---|---|
| Graphitized carbon black composite particles | 3 parts by weight |
| Flat permalloy particles (8.3 µm) | 13 parts by weight |
| Thermosetting silicone resin (a main agent) | 76 parts by weight |
| Thermosetting silicone resin (a curing agent) | 8 parts by weight |

ACTUAL EXAMPLE 19

Starting materials were mixed according to the recipe shown as Composition 3, and a sheet of 2 mm thick of a composition for preventing hindrance by electromagnetic waves was produced by the same method as in the case of Composition 1.

| Composition 3 | |
| --- | --- |
| Graphitized carbon black composite particles | 2 parts by weight |
| Magnetite powder (0.4 μm) | 28 parts by weight |
| Thermosetting silicone resin (a main agent) | 64 parts by weight |
| Thermosetting silicone resin (a curing agent) | 6 parts by weight |

ACTUAL EXAMPLE 20

Starting materials were mixed according to the recipe shown as Composition 4, and a sheet of 2 mm thick of a composition for preventing hindrance by electromagnetic waves was produced by the same method as in the case of Composition 1.

| Composition 4 | |
| --- | --- |
| Graphitized carbon black composite particles | 3 parts by weight |
| Flat soft magnetic material (Fe-based, 9.5 μm) | 20 parts by weight |
| Thermosetting silicone resin (a main agent) | 70 parts by weight |
| Thermosetting silicone resin (a curing agent) | 7 parts by weight |

ACTUAL EXAMPLE 21

Starting materials were mixed according to the recipe shown as Composition 5, and a sheet of 2 mm thick of a composition for preventing hindrance by electromagnetic waves was produced by the same method as in the case of Composition 1.

| Composition 5 | |
| --- | --- |
| Graphitized carbon black composite particles | 5 parts by weight |
| Ni—Zn—Cu ferrite (5 μm) | 10 parts by weight |
| Thermosetting silicone resin (a main agent) | 77 parts by weight |
| Thermosetting silicone resin (a curing agent) | 8 parts by weight |

ACTUAL EXAMPLE 22

Starting materials were mixed according to the recipe shown as Composition 6, and a sheet of 2 mm thick of a composition for preventing hindrance by electromagnetic waves was produced by the same method as in the case of Composition 1.

| Composition 6 | |
| --- | --- |
| Graphitized carbon black composite particles | 1 part by weight |
| Carbon fiber (fiber length: 1 mm) | 3 parts by weight |
| Flat permalloy particles (8.3 μm) | 10 parts by weight |
| Thermosetting silicone resin (a main agent) | 79 parts by weight |
| Thermosetting silicone resin (a curing agent) | 7 parts by weight |

ACTUAL EXAMPLE 23

Starting materials were mixed according to the recipe shown as Composition 7, and four sheets (thickness: 0.8 mm, 1.5 mm, 2 mm and 3 mm, respectively) of a composition for preventing hindrance by electromagnetic waves were produced by the same method as in the case of Composition 1.

| Composition 7 | |
| --- | --- |
| Graphitized carbon black composite particles | 5 parts by weight |
| Carbon fiber (fiber length: 1 mm) | 1 part by weight |
| Thermosetting silicone resin (a main agent) | 86 parts by weight |
| Thermosetting silicone resin (a curing agent) | 8 parts by weight |

ACTUAL EXAMPLE 24

Starting materials were mixed according to the recipe shown as Composition 8, and a sheet of 2 mm thick was produced by the same method as in the case of Composition 1.

| Composition 8 | |
| --- | --- |
| Ni—Zn—Cu ferrite | 60 parts by weight |
| Thermosetting silicone resin (a main agent) | 36 parts by weight |
| Thermosetting silicone resin (a curing agent) | 4 parts by weight |

ACTUAL EXAMPLE 25

Starting materials were mixed according to the recipe shown as Composition 9, and a sheet of 2 mm thick was produced by the same method as in the case of Composition 1.

| Composition 9 | |
| --- | --- |
| Flat permalloy particles (8.3 μm) | 30 parts by weight |
| Thermosetting silicone resin (a main agent) | 63 parts by weight |

-continued

| Composition 9 | |
|---|---|
| Thermosetting silicone resin (a curing agent) | 7 parts by weight |

| Composition 10 | |
|---|---|
| Graphitized carbon black composite particles | 4 parts by weight |
| Thermosetting silicone resin (a main agent) | 87 parts by weight |
| Thermosetting silicone resin (a curing agent) | 9 parts by weight |

ACTUAL EXAMPLE 26

Starting materials were mixed according to the recipe shown as Composition 10, and a sheet of 2 mm thick was produced by the same method as in the case of Composition 1.

Characteristics of the samples of Actual Examples 17 to 26 were measured by the same measuring methods as in Actual Examples 1 to 16. The results obtained are shown in Table 3.

TABLE 3

(Composition)

| Actual Example | Carbon black (wt. %) | Carbon fiber (wt. %) length 3 mm | Magnetic particles kind (wt. %) | Thickness (mm) |
|---|---|---|---|---|
| 17 | 3 | 0 | Mn—Zn—Fr (15) | 2 |
| 18 | 3 | 0 | Flat permalloy | 2 |
| 19 | 5 | 0 | Magnetite (15) | 2 |
| 20 | 5 | 0 | Flat soft magnetic material (15) | 2 |
| 21 | 5 | 0 | Mn—Zn—Cu—Fr (10) | 2 |
| 22 | 4 | 3 | Flat permalloy (10) | 2 |
| 23 | 5 | 1 | None | 0.8 |
| | | | | 1.5 |
| | | | | 2 |
| | | | | 3 |
| 24 | 0 | 0 | Mn—Zn—Fr (60) | 2 |
| 25 | 0 | 0 | Flat permalloy (30) | 2 |
| 26 | 4 | 0 | None | 2 |
| 27 | 0 | 0 | None | 2 |

(Characteristics)

| | Thickness (mm) | Frequency (GHz) | Degree of transmission (%) | Degree of absorption (%) | $\rho_{100KHz}$ | $\rho_{3MHz}$ | $\rho_{3MHz}/\rho_{100KHz}$ | Specific gravity (g/cm³) | Rigidity | Tensile strength (×10⁶ Pa) | Flame retardancy (mm/minute) |
|---|---|---|---|---|---|---|---|---|---|---|---|
| 17 | 2 | 0.05 | 54.5 | 43.3 | 26 | 11 | 0.42 | 1.15 | 47 | 7.2 | 45 |
| | | 0.5 | 39.1 | 53.1 | | | | | | | |
| | | 3 | 23.7 | 57.4 | | | | | | | |
| 18 | 2 | 0.05 | 55.0 | 40.6 | 63.8 | 38.4 | 0.60 | 1.11 | 46 | 6.8 | 48 |
| | | 0.5 | 22.9 | 42.9 | | | | | | | |
| | | 3 | 16.8 | 43.3 | | | | | | | |
| 19 | 2 | 0.05 | 39.8 | 54.9 | 27 | 8.4 | 0.31 | 1.00 | 47 | 7.2 | 45 |
| | | 0.5 | 31.0 | 58.3 | | | | | | | |
| | | 3 | 26.8 | 54.7 | | | | | | | |
| 20 | 2 | 0.05 | 55.6 | 41.3 | 41 | 12 | 0.29 | 1.18 | 49 | 8.1 | 40 |
| | | 0.5 | 22.6 | 56.3 | | | | | | | |
| | | 3 | 27.7 | 51.5 | | | | | | | |
| 21 | 2 | 0.05 | 57.8 | 40.7 | 21 | 4.5 | 0.21 | 1.12 | 44 | 7.9 | 28 |
| | | 0.5 | 45.8 | 49 | | | | | | | |
| | | 3 | 35.3 | 54.3 | | | | | | | |
| 22 | 2 | 0.05 | 57.2 | 40.9 | 16 | 6.2 | 0.39 | 1.03 | 46 | 7.2 | 41 |
| | | 0.5 | 43.9 | 49.8 | | | | | | | |
| | | 3 | 32.1 | 54.6 | | | | | | | |
| 23 | 0.8 | 0.05 | 23.2 | 62 | 76 | 19 | 0.25 | 1.03 | 38 | 5.1 | 45 |
| | | 0.5 | 10.2 | 63.9 | | | | | | | |
| | | 3 | 4.9 | 50.6 | | | | | | | |
| | 1.5 | 0.05 | 9.3 | 66.1 | | | | | | | |
| | | 0.5 | 3.8 | 53.8 | | | | | | | |
| | | 3 | 1.9 | 44.5 | | | | | | | |
| | 2 | 0.05 | 7.2 | 61.9 | | | | | | | |
| | | 0.5 | 2.2 | 48 | | | | | | | |
| | | 3 | 1.1 | 40.8 | | | | | | | |
| | 3 | 0.05 | 8.2 | 63.1 | | | | | | | |

TABLE 3-continued

|    |   |      |      |      |      |      |       |      |    |     |    |
|----|---|------|------|------|------|------|-------|------|----|-----|----|
|    |   | 0.5  | 2.2  | 46.8 |      |      |       |      |    |     |    |
|    |   | 3    | 1.8  | 49.6 |      |      |       |      |    |     |    |
| 24 | 2 | 0.05 | 99.5 | 0.2  | 7850 | 3060 | 0.039 | 2.36 | 53 | 1.5 | 85 |
|    |   | 0.5  | 92   | 4.5  |      |      |       |      |    |     |    |
|    |   | 3    | 73.8 | 15.3 |      |      |       |      |    |     |    |
| 25 | 2 | 0.05 | 99   | 0.7  | 7780 | 2780 | 0.036 | 1.36 | 58 | 2.1 | 70 |
|    |   | 0.5  | 83.3 | 7.6  |      |      |       |      |    |     |    |
|    |   | 3    | 43   | 3.2  |      |      |       |      |    |     |    |
| 26 | 2 | 0.05 | 89.5 | 10.5 | 985  | 121  | 0.12  | 1.02 | 38 | 5.1 | 33 |
|    |   | 0.5  | 83.2 | 13.1 |      |      |       |      |    |     |    |
|    |   | 3    | 79   | 17.2 |      |      |       |      |    |     |    |
| 27 | 2 | 0.05 | —    | —    | —    | —    | —     | 1.01 | 32 | 4.1 | 45 |
|    |   | 0.5  | —    | —    |      |      |       |      |    |     |    |
|    |   | 3    | —    | —    |      |      |       |      |    |     |    |

As is clear from Table 3, even when the materials other than ferrite are used as magnetic articles, the resulting compositions have satisfactory electromagnetic wave absorbing characteristics.

[Electric wave absorbing characteristics]

The material for prevention of electric waves produced in Actual Example 5 was formed into a sheet of 1 mm thick and its electric wave absorbing characteristics at 0.05 GHz to 20 GHz were measured by means of a HP8720C network analyzer mfd. by HEWLETT-PACKARD.

The electric power of incident electric waves was taken as 100% and each measured value was converted to electric power and expressed as a percentage. A remainder obtained by subtracting reflected electric power and transmitted electric power from the incoming electric power was taken as absorbed electric power.

Figure 1:
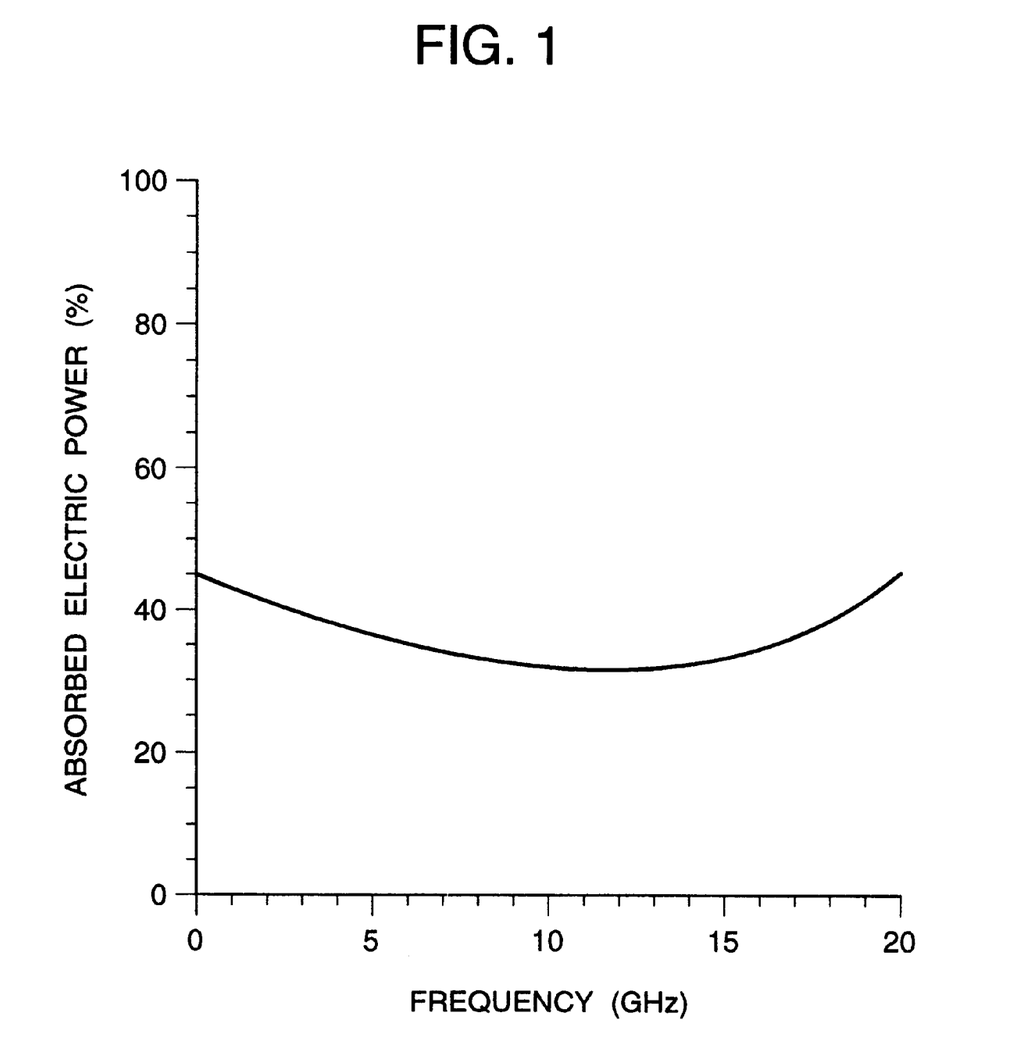
FIG. 1 is a characteristic graph showing electric wave absorbing properties of a sheet of 1 mm thick formed from the material for prevention of electric waves of the present invention.

The measurement results are shown in FIG. 1. As is clear from the characteristic curve shown in FIG. 1, the material for prevention of electric waves of the present invention formed into a sheet of 1 mm thick has substantially the same electric wave absorbing characteristics in the whole wide frequency range of 0.05 GHz to 20 GHz.

As explained above, according to the present invention, there can be provided a material for prevention of electric waves which has both shielding properties and electromagnetic wave absorbing properties and moreover is excellent in absorption characteristics in a wide range in all directions, flexible, thin and lightweight, by incorporating electroconductive fiber and/or ferrite particles besides graphitized carbon black composite particles into an insulating substrate. Therefore, the material for prevention of electric waves of the present invention can be formed into various shapes such as a sheet. This sheet can be conveniently used by attaching it to the wall surface of the plastic box of an electronic apparatus or winding it round the outer surface of a conductor cable.

What is claimed is:

1. A composition for prevention of electric waves in a wide range obtained by dispersing and incorporating carbon fiber or magnetic particles, or both and graphitized carbon black into an insulating substrate so that the weight ratio of said graphitized carbon black to said carbon fiber, said magnetic particles or the sum of the two may be 0.3 to 5.

2. The composition for prevention of electric waves in a wide range according to claim 1, wherein the degree of graphitization of said graphitized carbon black is 5 to 90%.

3. The composition for prevention of electric waves in a wide range according to claim 1, wherein said graphitized carbon black is incorporated so that the weight ratio of said graphitized carbon black to said carbon fiber, said magnetic particles or the sum of the two may be 1 to 3.

4. A composition for prevention of electric waves in a wide range obtained by dispersing and incorporating carbon fiber and graphitized carbon black into an insulating substrate, the ratio of the fiber length of said carbon fiber to the particle diameter of said graphitized carbon black being less than 5,000.

5. The composition for prevention of electric waves in a wide range according to claim 4, wherein said carbon fiber is incorporated so that the weight ratio of said carbon fiber to said graphitized carbon black may be 0.25 to 2.

6. The composition for prevention of electric waves in a wide range according to claim 4, wherein the ratio of the fiber length of said carbon fiber to the particle diameter of said graphitized carbon black is 1,300 to 4,000.

7. A composition for prevention of electric waves in a wide range obtained by dispersing and incorporating carbon fiber and graphitized carbon black into an insulating substrate, the ratio of the fiber length of said carbon fiber to the particle diameter of said graphitized carbon black being 5,000 or more.

8. The composition for prevention of electric waves in a wide range according to claim 7, wherein said carbon fiber is incorporated so that the weight ratio of as said carbon fiber to said graphitized carbon black may be 0.25 to 2.

9. The composition for prevention of electric waves in a wide range according to claim 7, wherein the ratio of the fiber length of said carbon fiber to the particle diameter of said graphitized carbon black is 10,000 to 100,000.

10. A composition for prevention of electric waves in a wide range obtained by dispersing and incorporating carbon fiber or magnetic particles, or both and graphitized carbon black into an insulating substrate, the ratio of the volume resistivity of the composition measured at 3 KHz ($\rho_{3MHz}$) to the volume resistivity of the composition measured at 100 kHz ($\rho_{100KHz}$) ($\rho_{3MHz}/\rho_{100KHz}$) being 0.1 to 1.5.

11. An electric wave absorber coping with all directions obtained by dispersing and incorporating carbon fiber or magnetic particles, or both and graphitized carbon black into an insulating substrate so that the weight ratio of said graphitized carbon black to said carbon fiber, said magnetic particles or the sum of the two may be 0.3 to 5, and molding or forming the resulting composition to a thickness of 2 mm or less.

12. An electric wave absorber coping with all directions obtained by dispersing and incorporating carbon fiber or magnetic particles, or both and graphitized carbon black into an insulating substrate, which absorbs 10% or more (at a thickness of the absorber of 2 mm) of electromagnetic waves in terms of electric power at at least one frequency in a wide frequency range of 30 MHz to 20 GHz, and has a degree of transmission of 10% or less.

13. An electric wave absorber coping with all directions obtained by dispersing and incorporating carbon fiber or magnetic particles, or both and graphitized carbon black into an insulating substrate, which has a specific gravity of 2.5 or less.

14. The electric wave absorber coping with all directions according to claim 13, which has a specific gravity of 1.5 or less.

15. An electric wave absorber coping with all directions obtained by dispersing and incorporating carbon fiber or magnetic particles, or both and graphitized carbon black into an insulating substrate, which has a flexibility of 50 (JISA) or less as measured by the rigidity test according to JIS K6253.

16. An electric wave absorber coping with all directions obtained by dispersing and incorporating carbon fiber or magnetic particles, or both and graphitized carbon black into an insulating substrate, which has such a flame retardancy that when the fire of a burner is brought close to a test piece (thickness 3.05 mm, width 10.0 mm, length 200 mm) and then removed in the combustion test according to UL94HB, the combustion rate is 38.1 mm/min. or less.

17. An electric wave absorber coping with all directions obtained by dispersing and incorporating carbon fiber or magnetic particles, or both and graphitized carbon black into an insulating substrate, which has a tensile strength of $4 \times 10^6$ (Pa) or more as measured by the tensile test according to JIS K6251 (balance method).

* * * * *